(12) United States Patent
Buckle et al.

(10) Patent No.: US 7,976,298 B2
(45) Date of Patent: Jul. 12, 2011

(54) ARTICLE, METHOD AND APPARATUS OF FORMING EXPANDED PLASTIC MATERIALS IN A STEAM CHEST MOLD

(75) Inventors: Dwight K. Buckle, Guelph (CA); Robert Dernovsek, Guelph (CA); Alan C. Cave, Mount Forest (CA); Jimmy M. Escedi, Waterloo (CA); Antoine Zafera, Waterloo (CA); Danny Grunsted Solberg Jensen, Cambridge (CA)

(73) Assignee: Magna International Inc., Concord, Ontario (CA)

( * ) Notice: Subject to any disclaimer, the term of this patent is extended or adjusted under 35 U.S.C. 154(b) by 1009 days.

(21) Appl. No.: 10/581,138

(22) PCT Filed: Dec. 23, 2004

(86) PCT No.: PCT/CA2004/002194
§ 371 (c)(1),
(2), (4) Date: May 31, 2006

(87) PCT Pub. No.: WO2005/061201
PCT Pub. Date: Jul. 7, 2005

(65) Prior Publication Data
US 2007/0098934 A1    May 3, 2007

(51) Int. Cl.
*B29C 44/38* (2006.01)
(52) U.S. Cl. ........................................ 425/4 R; 425/577
(58) Field of Classification Search .................. 425/4 R, 425/547, 577, 556
See application file for complete search history.

(56) References Cited

U.S. PATENT DOCUMENTS

| | | | | |
|---|---|---|---|---|
| 3,548,451 A | * | 12/1970 | Carmi et al. | 425/4 R |
| 4,114,759 A | * | 9/1978 | Maloney, Jr. | 206/523 |
| 4,557,881 A | | 12/1985 | Rabotski | |
| 4,680,003 A | * | 7/1987 | Schulte et al. | 425/206 |
| 5,776,521 A | * | 7/1998 | Wright et al. | 425/556 |

(Continued)

FOREIGN PATENT DOCUMENTS

| FR | 2812234 | 2/2002 |
|---|---|---|
| JP | 2003001634 | 1/2003 |

OTHER PUBLICATIONS

"Injection Mould Design," 4th Edition, (Pye, R.G.W.) 1983; pp. 301-339.

(Continued)

*Primary Examiner* — Yogendra N Gupta
*Assistant Examiner* — Emmanuel S Luk
(74) *Attorney, Agent, or Firm* — Miller Canfield

(57) ABSTRACT

The invention provides an article, a method and an apparatus of forming expanded plastic materials in a steam chest mold having out of die draw features. This is achieved by means of a cavity pull system. The cavity pull system allows for the provision of molded features outside the die draw and is designed to operate on a cam type system using two stainless steel rods running at a right angle to one another. A gear mechanism allows molded features, e.g. holes, to be formed at any angle on any part design where enough part geometry exists to accommodate the forming features and in the tool for mechanism components. The invention is advantageously employed in the formation of holes outside the die draw in vertically stacked injection tools for energy absorbers used in vehicle bumper fascias. The provision of out of die draw molded features is useful for fascia component locating or attachment.

7 Claims, 5 Drawing Sheets

U.S. PATENT DOCUMENTS

| | | | |
|---|---|---|---|
| 6,353,415 | B1 | 3/2002 | Ashtiani et al. |
| 6,361,723 | B1 * | 3/2002 | Sulzbach et al. ............... 264/51 |
| 6,450,797 | B1 * | 9/2002 | Joseph ........................ 425/556 |
| 6,821,465 | B1 | 11/2004 | Stein et al. |
| 6,872,350 | B2 * | 3/2005 | Swartz ......................... 264/334 |
| 7,157,037 | B2 * | 1/2007 | Seidelman et al. ........... 264/318 |
| 2002/0121715 | A1 | 9/2002 | Sandefer et al. |
| 2002/0195736 | A1 * | 12/2002 | Potter ............................ 264/51 |
| 2003/0059596 | A1 * | 3/2003 | Nohara et al. ............. 428/304.4 |
| 2003/0094722 | A1 * | 5/2003 | Matsuki et al. .............. 264/45.4 |
| 2003/0111852 | A1 | 6/2003 | Carley et al. |
| 2004/0234636 | A1 * | 11/2004 | Murata et al. ................ 425/4 R |
| 2007/0057409 | A1 * | 3/2007 | Sato ............................. 264/335 |

OTHER PUBLICATIONS

International Search Report & Written Opinion for PCT/CA2004/002194 dated May 9, 2005.
English Abstract of JP2003001634 Dated Jan. 8, 2003.
English Abstract of FR 2812234 Dated Feb. 1, 2002.

* cited by examiner

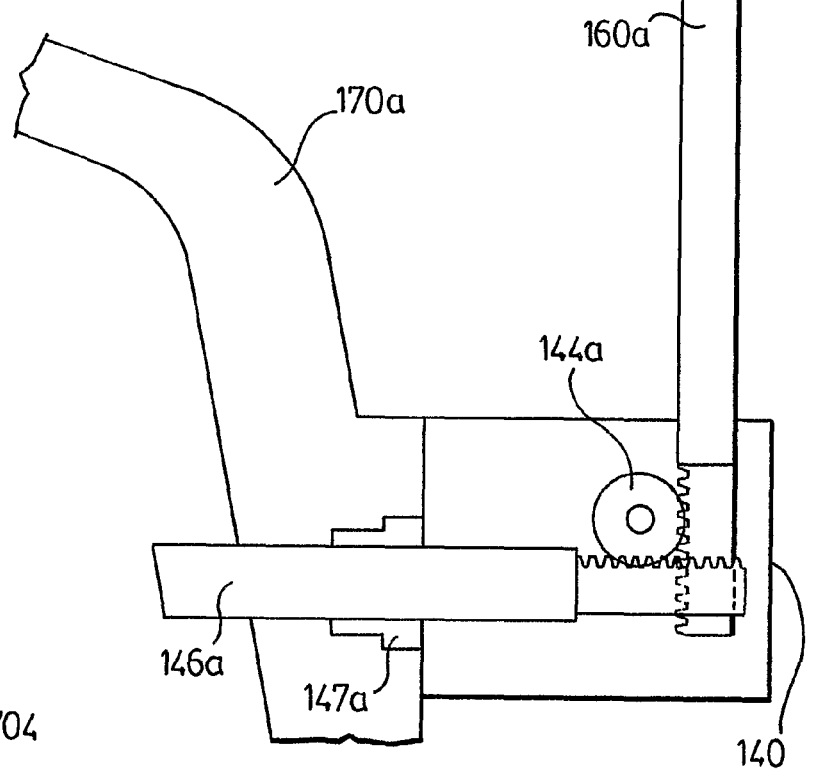
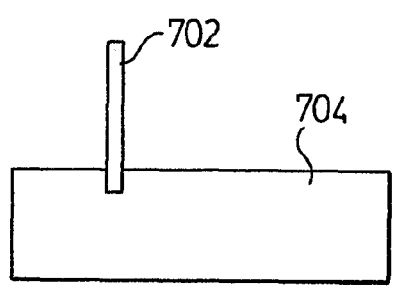
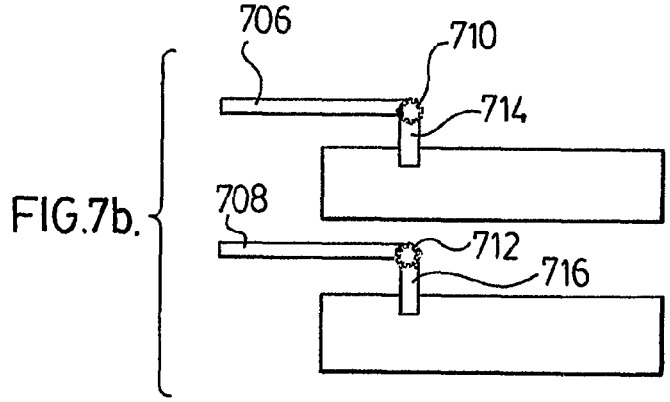

ARTICLE, METHOD AND APPARATUS OF FORMING EXPANDED PLASTIC MATERIALS IN A STEAM CHEST MOLD

FIELD OF THE INVENTION

The present invention relates generally to the field of products from expanded plastic materials molded in a steam chest and to a steam chest molding apparatus and a method of forming expanded plastic materials therein.

BACKGROUND OF THE INVENTION

A plurality of products made from particles or beads of expanded plastic materials are widely employed, for example as heat insulating materials, packaging materials, cushioning materials, or energy absorbers.

Energy absorbing elements are used in particular in the structure of motor vehicles in order to receive a large part of the kinetic energy of impact, and thus to increase the safety of occupants and pedestrians. Prior art applications are shock absorbers, side doors, and impact deflector elements which are used for the support of bumpers with respect to the supporting body structure.

Over the past few decades, energy absorption management has become an increasingly important part of the design and construction of modern transportation vehicles. Early on, it was recognized that vehicles designed with deformable front and/or rear structures provided greater safety to vehicle occupants in the case of a crash, due to the impact energy absorption by the structure as it deforms. It has become increasingly common to design vehicles, particularly automobiles, in this manner. However, while deformable structures such as these are helpful in preventing or minimizing injuries to passengers, as a result of the severe structural damage done to the vehicle, repair and reconstruction of the vehicle is an expensive and time-consuming practice. Repair procedures are especially viewed as unnecessary when the impact involves low to moderate energy, which might be encountered in bumper-to-bumper contact in a parking lot, for example. To mitigate against damage caused by such relatively energy deficient impacts, it has become common to mount automobile bumpers by resilient but energy absorptive mounts, or to prepare the bumpers themselves out of energy-absorptive material. For example, expanded polypropylene (EPP) within a glass fiber reinforced exterior shell has been used for such purposes, the EPP providing for excellent energy absorption coupled with resilience enabling the bumper to spring back to its pre-impact shape, and the glass fiber reinforced shell providing sufficient structural strength for the bumper to serve as a structural as well as energy-absorptive component.

Concerns with vehicular impacts have extended to the passenger compartment as well, and over the past few decades, the plethora of angular objects extending into the passenger compartment such as window cranks, door handles, door lock buttons, and the like, have decreased, have been recessed so as to no longer protrude, or been eliminated entirely. Moreover, many of the car interior materials such as those found in dashboards, side bolsters, pillars, and even seats and headrests, have been selected with impact energy absorption in mind.

Current processes for making expanded plastic materials involve placing a mold inside a steam chest, filling the mold with plastic pellets and filling the steam chest with steam such that the steam enters the mold through vents in the mold, allowing the pellets to expand and fuse together. Thus, in a steam chest, the mold components are exposed to an immoderate environment of extreme temperatures and humidity. In order to mold products with out of die draw features in such a steam chest, the mold requires additional members aside from the mold core and cavity. Providing fixed members, such as fixed pins for forming holes, would cause a locking condition resulting in a damaged part upon ejection of the molded products. Furthermore, any devices used to retract such pins, such as hydraulic cylinders, need to be enclosed or sealed within the steam chest. However, difficulties arise when providing retractable mold members inside the steam chest because of the immoderate conditions therein which can lead to mechanism failures.

Thus, it is desirable to provide products molded in a steam chest that have out of die draw features.

It is furthermore desirable to provide an apparatus for molding products in a steam chest that provides for the molding of out of die draw features.

It is further desirable to provide a method for molding plastic products in a steam chest having out of die draw features.

SUMMARY OF THE INVENTION

In accordance with the invention there is provided, a steam chest molded article molded from an expandable plastic material comprising a molded feature out of die draw.

In accordance with another aspect of the invention, the molded feature is at least one of a recessed and a protruded feature. The molded feature can have one of a plurality of angles outside the line of die draw.

In accordance with yet another aspect of the invention, the expandable plastic material is one of a styrene polymer, an acrylonitrile butadiene styrene (ABS) polymer, and a polyolefin. In accordance with an embodiment of the invention, the expandable plastic material is polypropylene.

In accordance with a further aspect of the invention, the steam chest molded article is for use as an energy absorber in automotive vehicles.

In accordance with the invention, there is further provided, a steam chest mold apparatus for forming molded articles having out of die draw features comprising a first mold portion and a complementary second mold portion for defining a mold cavity therebetween, said first mold portion including a fill plate having an inlet for introducing an expandable plastic material into the mold cavity; and a cavity pull system comprising an actuator, a gear mechanism and a pin, the actuator extending through the fill plate to the gear mechanism and the pin extending from the gear mechanism into the mold cavity, said gear mechanism for translating a movement from the actuator to the pin, and wherein the pin is for forming the out of die draw features.

In accordance with another aspect of the invention, the gear mechanism includes a pinion and a rack pin, said rack pin for being driven into the mold cavity. In an embodiment of the invention, the rack pin is guided by a bushing.

In accordance with yet another aspect of the invention, the cavity pull system is made from a temperature resistant and humidity resistant material, such as stainless steel. In accordance with an embodiment of the invention, the gear mechanism is a made from brass.

In accordance with another aspect of the invention, the pin is for engaging into the mold cavity at a plurality of angles so as to provide molded features at a plurality of angles out of die draw. The pin is moveable between a first position substantially outside the mold cavity and a second position substantially inside the mold cavity.

In accordance with the invention, there is further provided, an energy absorbing element for absorbing an impact in a vehicle, said energy absorbing element made from expandable polypropylene in a steam chest mold, the energy absorbing element comprising an out of die draw feature.

In accordance with a further aspect of the invention the out of die draw feature has one of a plurality of angles outside the line of the die draw.

In accordance with another aspect of the invention, there is provided, a process for making a steam chest molded product including a molded feature that is outside the line of die draw comprising the following steps: providing a first mold portion; providing a second mold portion, said second mold portion being complementary to the first mold portion; closing the first and the second mold portion with respect to one another for forming the mold cavity therebetween; engaging a cavity pull system for molding a feature that is outside the line of die draw; filling the mold cavity with an expandable plastic material; introducing steam into the mold cavity for expanding and bonding the expandable plastic material to form the molded product; disengaging the cavity pull system; opening the mold; and de-molding the molded product.

In accordance with a further aspect of the invention, the step of engaging the cavity pull system comprises the steps of actuating a cylinder for driving a gear mechanism and wherein said gear mechanism is for driving a pin into the mold cavity. The pin is driven into the mold cavity at one of a plurality of angles for providing a molded feature at one of a plurality of angles outside the line of die draw.

In accordance with yet another aspect of the invention, the molded feature is a recessed or protruded feature.

In accordance with a further aspect of the invention, the process is used to form an energy absorbing element including a molded feature that is outside the line of die draw.

BRIEF DESCRIPTION OF THE DRAWINGS

Exemplary embodiments of the invention will now be described in conjunction with the following drawings wherein like numerals represent like elements, and wherein:

FIG. 6 presents a schematic cross-sectional side view showing a more detailed view of the gear mechanism of the cavity pull system; and FIGS. 7a and 7b are schematic representations showing a cylinder actuator movement for a single cavity system and a multi cavity system, respectively.

DETAILED DESCRIPTION OF THE PREFERRED EMBODIMENTS

Figure 1:
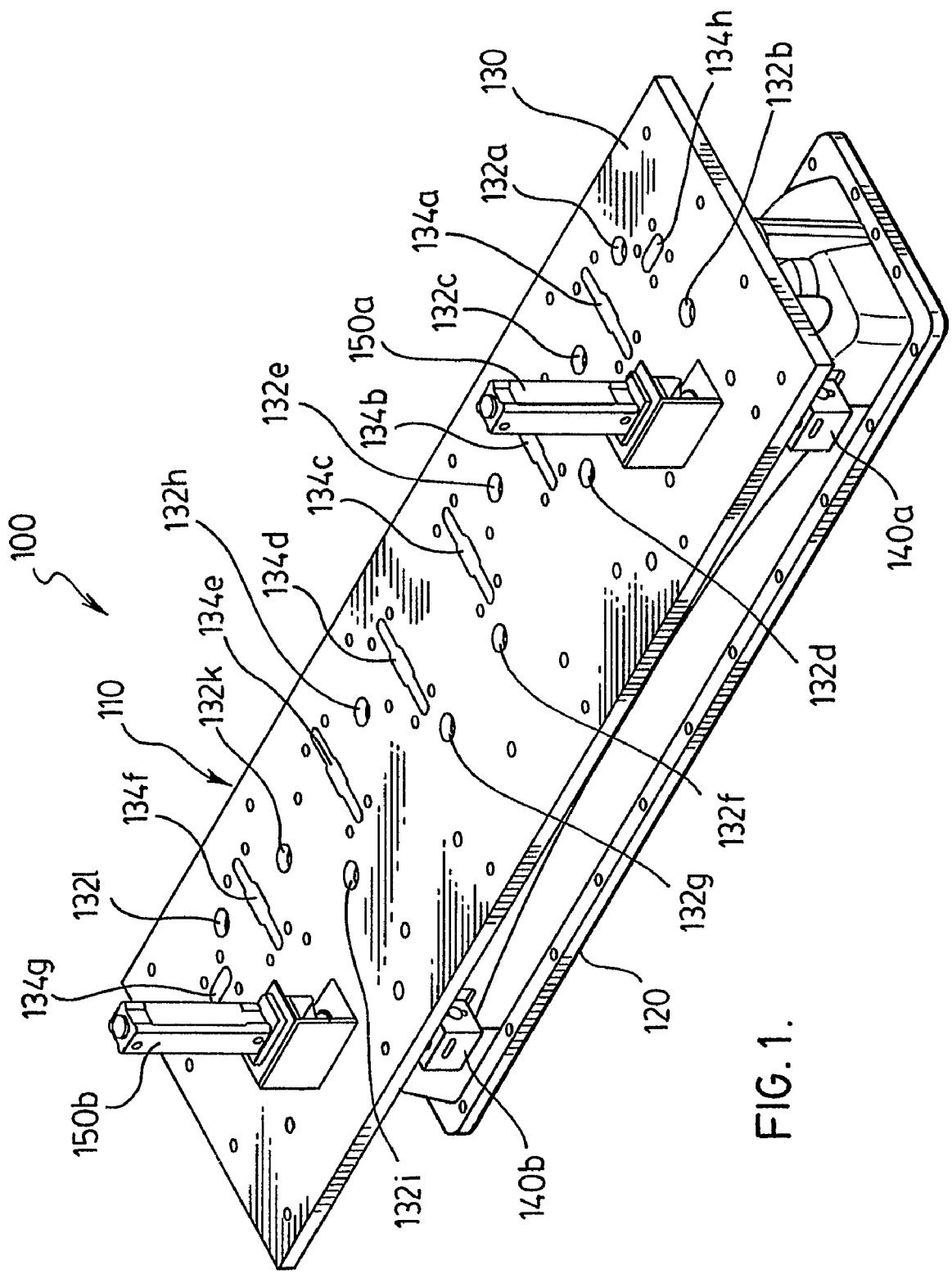
FIG. 1 shows an isometric view of a cavity side of a steam chest molding apparatus in accordance with the present invention.

The present invention provides molded products from expanded plastic particles, such as beads, that are molded in a steam chest. These products include out of die draw features. The invention further provides a method and an apparatus for making products including out of die draw features molded in a steam chest from expanded plastic particles.

U.S. Pat. No. 4,456,443 to Rabotski, incorporated herein by reference, discloses a machine and a method for steam chest molding of foamed material wherein articles such as foamed boards or sheets are molded from expanded foam material, such as polystyrene. A cavity is filled with beads of partially expanded polystyrene and steam is used to completely expand the beads. The article is then cooled with water.

The processes for forming expandable particles or beads are by now well known, as illustrated by the following U.S. Pat. Nos. 5,496,864; 5,468,781; 5,459,169; 5,071,883; 4,769,393; and 4,676,939, which are incorporated herein by reference. Examples of expandable plastic articles are styrene polymers, acrylonitrile butadiene styrene (ABS) polymers, and polyolefins.

Expanded polyolefins are commonly used as expanded plastic particles. Examples of expanded polyolefin (EPO) include expanded polyethylene (EPE), expanded polypropylene (EPP), expanded polybutylene (EPB), and copolymers of ethylene, propylene, butylene, 1,3-butadiene, and other olefin monomers, particularly α-olefin monomers having from 5 to 18 carbon atoms, and/or cycloalkylene monomers such as cyclohexane, cyclopentene, cyclohexadiene, norbornene, and aromatic substituted olefins such as styrene, α-methylstyrene, paramethylstyrene, and the like. A preferred EPO is expandable polypropylene (EPP) and its copolymers with ethylene and butylene. The particular polymer and/or copolymer is selected so as to provide the desired physical properties, such as tensile strength, compressive strength, modulus, density, molding temperature, softening point, etc.

Expandable polyolefins are produced by a bead polymerization process in which relatively small uniform beads of polymer are produced, containing a gas which is later utilized to effect blowing during the molding process. The most commonly used gas is air, although other gases including low boiling liquids which produce gases at the molding temperatures may be used. Suitable, for example, are air, nitrogen, carbon dioxide, pentane, petroleum ether, methylethylketone, various halocarbons, and the like. For environmental concerns, permanent gases, such as air, nitrogen, carbon dioxide, and the like, are advantageously used as blowing agents.

For example, U.S. Pat. No. 4,812,484, incorporated herein by reference, provides a description for the preparation of expanded polypropylene particles in the Background of the Invention section by a process comprising dispersing polypropylene particles in water in a closed vessel, feeding a blowing agent to the vessel, heating the dispersion to a temperature of from the softening point of the polypropylene particles up to a temperature higher than the melting point of the polypropylene particles by 20° C. while keeping the inner pressure at the vapor pressure of the blowing agent or higher, and opening an outlet provided below a liquid level of the closed vessel to thereby release an aqueous dispersion containing polypropylene particles impregnated with the blowing agent into an atmosphere having a pressure lower than the inner pressure of the closed vessel. For details, reference can be made to it, e.g., in Japanese Laid-Open Patent Application Nos. 12035/82, 25336/82, 90027/82, 195131/82, 1732/83, 23834/83, 25334/83, 33435/83, 55231/83, 76229/83, 76231/83 to 76234/83 and 87027/83. According to this process, expanded polypropylene particles having a bulk density of from 0.026 to 0.06 g/cm$^3$ can be obtained. It is known that the above process is also applicable to production of polyethylene particles or crosslinked polyethylene particles as described in the above-cited publications.

The molded articles made from expanded plastic particles can then be obtained by compressing the expanded plastic particles with pressurized nitrogen gas or air, charging the compressed particles into a cavity of a mold, and heating the particles to fuse with each other, followed by cooling.

Figure 2:
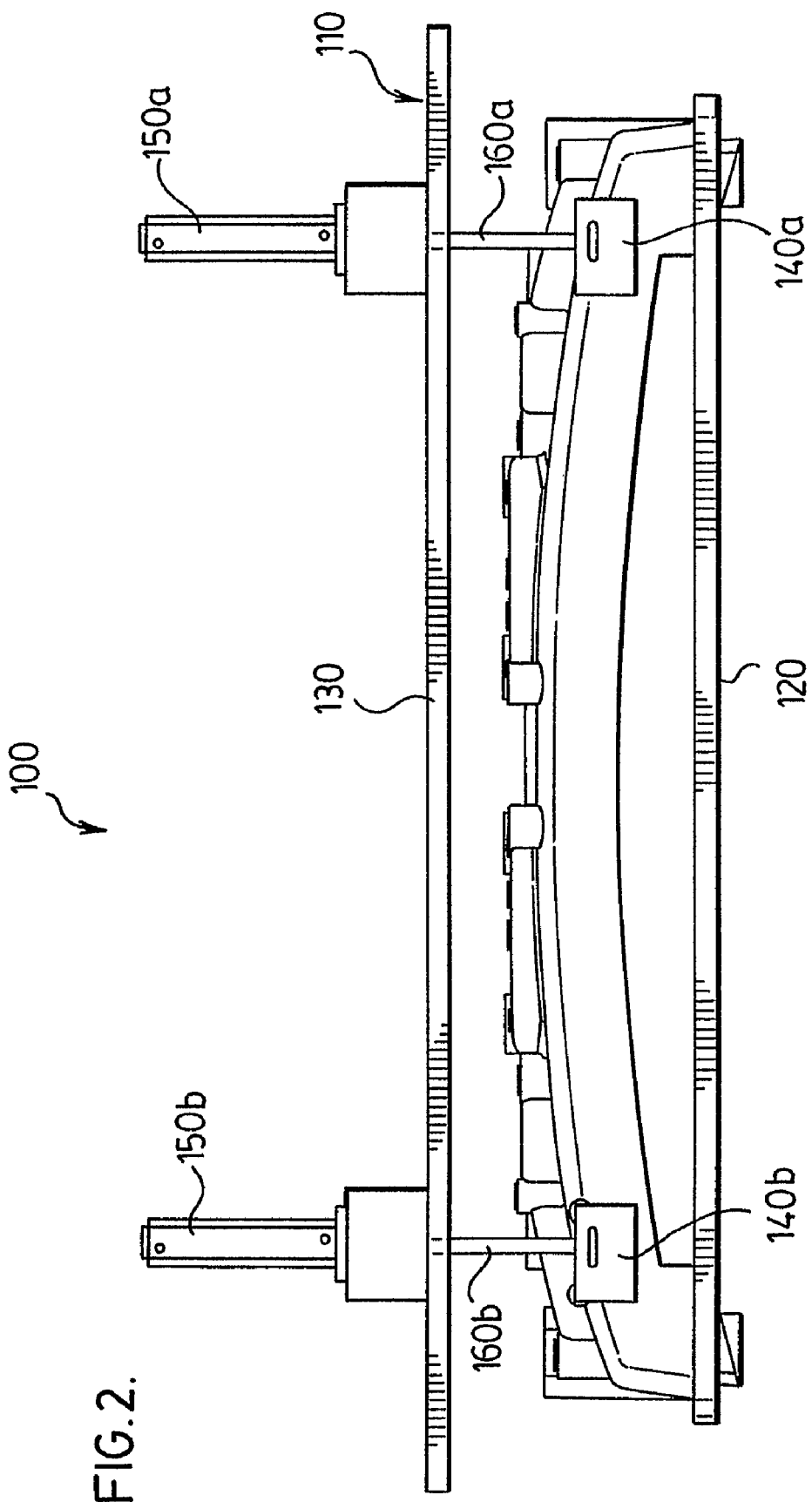
FIG. 2 shows a front elevational view of a cavity side of the steam chest molding apparatus in accordance with the present invention.

Turning now to FIG. 1, an isometric view of a steam chest molding apparatus 100 in accordance with the present invention is shown. The steam chest molding apparatus 100 includes a first mold portion 110, the cavity side, and a second mold portion (not shown), the core side. The first mold portion 110 includes a cavity plate 120, a fill plate 130 having a plurality of fill inlets 132a-1 and slide locations 134a-h for forming a multi-density energy absorber system. The first mold portion 110 and the second mold portion form a mold cavity for forming a molded article therebetween. Furthermore, the first mold portion includes air vents (not shown) so that steam can pass through the mold cavity. In accordance with an embodiment of the present invention, the first mold portion 110 includes at least one cavity pull system 140a and/or a second cavity pull system 140b actuated by cylinder actuator 150a and/or 150b via cylinder shafts 160a and/or 160b, respectively. This is seen in more detail in FIG. 2 showing a front elevational view of the cavity side of the steam chest molding apparatus 100 in accordance with the present invention. If desired, additional cavity pull systems are employed. The number of cavity pull systems per mold portion is selected in dependence upon a number of features to be molded outside the line of the die draw. The cavity pull system in accordance with the present invention is explained in more detail hereinafter in conjunction with FIGS. 3-6.

The cavity pull system in accordance with an embodiment of the present invention is engaged prior to a filling of the steam chest mold with beads of an expandable plastic material. The first mold portion includes at least one, and advantageously a plurality of fill inlets 132a-1, extending into the mold cavity to allow fill guns (not shown) to fill the mold cavity with the plastic material for the article to be molded therein. For example, the mold cavity is filled with beads of expanded polypropylene which enter the mold via the fill inlets. Then, steam is provided to the mold cavity via air vents to expand and bond the polypropylene particles to form the molded article. The steam fuses the beads of expanded polypropylene together into the molded article, such as an energy absorber for a motor vehicle fascia. The steam enters through air vents in the first mold portion to expand the beads of polypropylene. After the article is molded, the mold and the article therein are cooled, for example, by spraying a coolant, such as water, through nozzles (not shown) onto the backside of the cavity. After the molded article is fused and cooled, the cavity pull system is retracted from the mold and the mold is opened and the molded article is removed or demolded from the mold. Pressurized air may be introduced to assist in the separation of the mold and the molded article.

Figure 3:
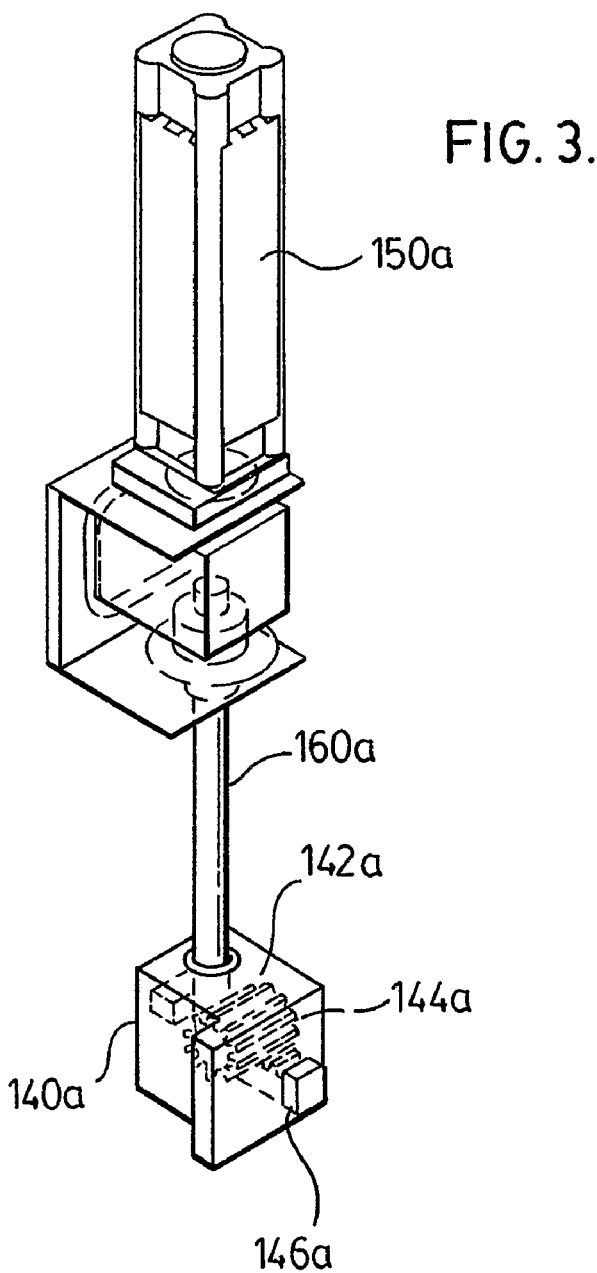
FIG. 3 shows a detailed isometric view of the cavity pull system in accordance with the invention.
Figure 4:
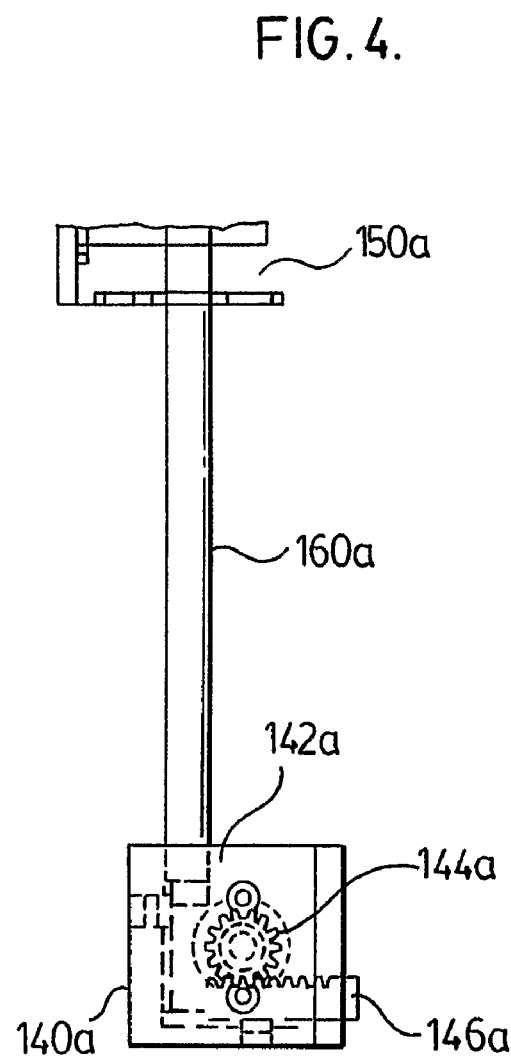
FIG. 4 shows a detailed cross-sectional side view of the cavity pull system in accordance with the invention.

Turning now to FIGS. 3 and 4, a detailed isometric view and a detailed cross-sectional side view of cavity pull system 140a are shown. The cavity pull system 140a is driven by cylinder actuator 150a via cylinder shaft 160a. Cavity pull system 140a includes a shaft housing 142a that is coupled directly to a cavity wall 170a of the first mold portion 110 and a gear mechanism. The gear mechanism includes a pinion 144a and a rack pin 146a which is driven into the mold cavity.

Figure 5:
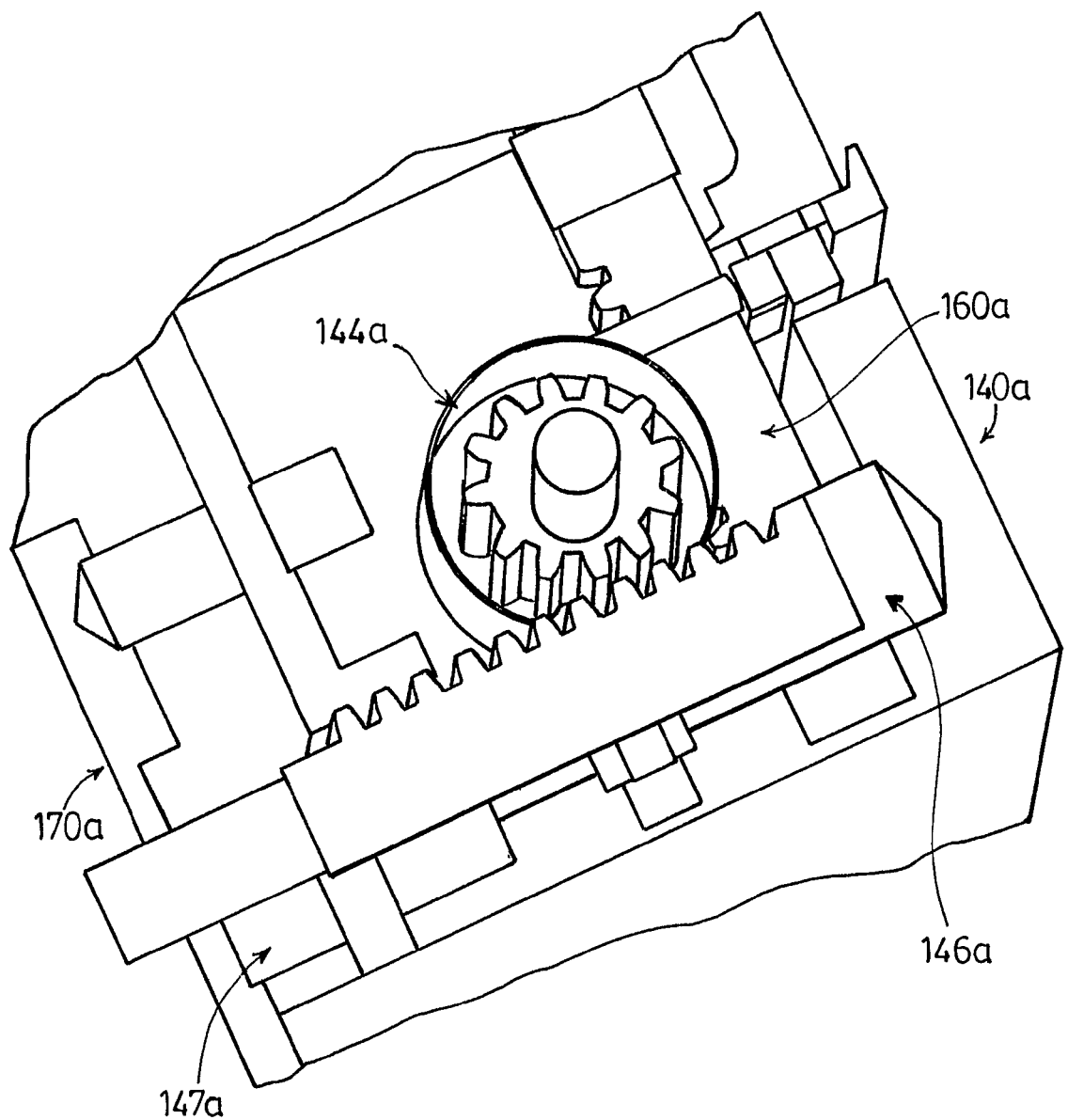
FIG. 5 presents an isometric view showing a more detailed view of the gear mechanism of the cavity pull system.

FIGS. 5 and 6 present an isometric view and a schematic cross-sectional side view, respectively, to show the gear mechanism of cavity pull system 140a in more detail. The cylinder shaft 160a extends beyond fill plate 130 into the shaft housing 142a where it engages with the pinion 144a to drive the rack pin 146a guided by bushing 147a through the cavity wall 170a into the mold cavity. Thus, the cavity pull system 140a is designed to operate on a cam-type system using two stainless steel rods, viz, the cylinder shaft 160a and the rack pin 146a, running substantially at a right angle to one another. A brass gear actuated mechanism allows for the formation of out-of-die-draw protruded or recessed features at any angle on any molded article design, where enough article geometry exists to accommodate the forming features and in the tool/mold for mechanism components.

Thus, the present invention relates to an apparatus and a method for molding recessed or protruded features outside the line of die draw in a steam chest mold. Furthermore, in accordance with the present invention, articles are molded in a steam chest that have out of die draw recessed or protruded features. For example, the invention allows to form holes outside the die draw in vertically stacked injection tools for molding energy absorbers for vehicle bumper fascia used on automotive vehicles. In order to do so, all locations of such steam chest molded features have to be draft back to the parting line of the tool. This would result in a long locating slot that does not have any locating potential before and after the steam chest molding process. Thus, the cavity pull system in accordance with an embodiment of the invention as described heretofore is designed to provide such locating potential. The cavity pull system and the cylinder shaft in accordance with an embodiment of the present invention can be safely enclosed in the steam chest molding apparatus to withstand the extreme temperatures and humidity therein without leading to mechanism failure.

The components of the cavity pull system are made of a temperature and humidity resistant material, for example a heat and humidity resistant stainless steel. The seal is achieved by means of a fine precision fit. If desired, a grease is used to supplement the seal. The cylinder actuator shafts are mounted to the fill plate and extend into the gear mechanism as seen from FIGS. 2-6.

Turning now to FIGS. 7a and 7b, it is apparent that the cavity pull system including its gear mechanism is in particular advantageous in providing molded features in a multi cavity system. FIG. 7a shows a single cavity system employing a single cylinder actuator 702 extending linearly into the mold 704. However, as is seen in FIG. 7b, in a multi cavity system it is necessary to translate the movement of the cylinder actuators 706 and 708 from a horizontal movement to a vertical movement and vice versa via gear mechanisms 710 and 712 to engage rack pins 714 and 716. The pins can be engaged into the mold cavity at a plurality of angles so as to provide molded features at a plurality of angles outside the line of die draw provided that there is sufficient article geometry to accommodate the forming features and in the tool/mold for mechanism components.

Advantageously, in accordance with the present invention, articles that are molded in a steam chest are ejected from the mold with ease by retracting the rack pins that provide the out of die draw features. Furthermore, the provision of out of die draw features during the molding process reduces the amount of labor that would otherwise have to be employed after the molding process to provide such recessed or protruded features, such as holes in the molded article. Advantageously, the gear mechanism of the cavity pull system allows for the provision of molded features that can have a plurality of angles outside the line of die draw, if there is enough article geometry in the mold and to accommodate the forming features therein.

The present invention is particularly suited to provide energy absorbers for automotive vehicles that are molded with vertically formed holes for fascia component locating or attachment but can be used to provide any kind of products molded in a steam chest mold and having out of die draw features.

The above-described embodiments of the invention are intended to be examples of the present invention and numerous modifications, variations, and adaptations may be made to the particular embodiments of the invention without departing from the spirit and scope of the invention, which is defined in the claims.

What is claimed is:

1. A steam chest mold apparatus for forming a molded article having at least one out of die draw feature comprising:
   a first mold portion and a complementary second mold portion for defining a mold cavity therebetween, said first mold portion including a cavity wall and a fill plate having an inlet for introducing an expandable plastic material into the mold cavity; and
   a cavity pull system comprising an actuator, a cylinder shaft operably coupled to the actuator and extending through the fill plate, a shaft housing coupled directly to the cavity wall of the first mold portion, and a gear mechanism disposed within the shaft housing, the gear mechanism including a pinion engaging the cylinder shaft within the shaft housing and a rack pin engaging the pinion within the shaft housing, the rack pin substantially at a right angle to the cylinder shaft and extending from the shaft housing into the mold cavity, the engagement of the cylinder shaft and the pinion causing linear motion of the rack pin into the mold cavity for forming the at least one out of die draw feature.

2. The steam chest mold apparatus as defined in claim 1 wherein the rack pin is guided by a bushing, wherein the bushing is disposed in the cavity wall of the first mold portion directly adjacent the shaft housing.

3. The steam chest mold apparatus as defined in claim 1 wherein the cavity pull system is made from a temperature resistant and humidity resistant material.

4. The steam chest mold apparatus as defined in claim 3 wherein the temperature resistant and humidity resistant material is a stainless steel.

5. The steam chest mold apparatus as defined in claim 1 wherein the gear mechanism is made from brass.

6. The steam chest mold apparatus as defined in claim 1 wherein the pin is for engaging into the mold cavity at a plurality of angles so as to provide a molded feature at a plurality of angles out of die draw.

7. The steam chest mold apparatus as defined in claim 1 wherein the pin is moveable between a first position substantially outside the mold cavity and a second position substantially inside the mold cavity.

\* \* \* \* \*